US010045244B2

(12) United States Patent
Mali et al.

(10) Patent No.: US 10,045,244 B2
(45) Date of Patent: Aug. 7, 2018

(54) ENHANCED CONNECTION PERFORMANCE IN UL/DL IMBALANCE SCENARIOS

(71) Applicant: QUALCOMM Incorporated, San Diego, CA (US)

(72) Inventors: Nikhil Mali, Parsippany, NJ (US); Madhusudan Kinthada Venkata, San Diego, CA (US); Siva Kumar Jujaray, San Diego, CA (US); Manjinder Singh Sandhu, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 79 days.

(21) Appl. No.: 15/228,748

(22) Filed: Aug. 4, 2016

(65) Prior Publication Data

US 2017/0070904 A1    Mar. 9, 2017

Related U.S. Application Data

(60) Provisional application No. 62/214,199, filed on Sep. 3, 2015.

(51) Int. Cl.
*G01R 31/08* (2006.01)
*H04L 5/14* (2006.01)
(Continued)

(52) U.S. Cl.
CPC ............. *H04W 24/10* (2013.01); *H04L 43/16* (2013.01); *H04W 24/08* (2013.01);
(Continued)

(58) Field of Classification Search
CPC . H04W 24/10; H04W 36/0088; H04W 36/06; H04W 72/042; H04L 43/16
See application file for complete search history.

(56) References Cited

U.S. PATENT DOCUMENTS 8,964,913 B1    2/2015    Feng et al.
2011/0110254 A1*    5/2011    Ji .................. H04W 36/0066
                                                                 370/252
(Continued)

FOREIGN PATENT DOCUMENTS

WO    WO-9637966 A1    11/1996

OTHER PUBLICATIONS

ISA/EP, International Search Report and Written Opinion of the International Searching Authority, Int'l Application No. PCT/US2016/045805, dated Oct. 19, 2016, European Patent Office, Rijswijk, NL, 15 pgs.

*Primary Examiner* — Brian Roberts
*Assistant Examiner* — Abu-Sayeed Haque
(74) *Attorney, Agent, or Firm* — Holland & Hart LLP/Qualcomm

(57) ABSTRACT

A multi-antenna device configured for addressing connection performance issues in UL/DL imbalance scenarios is described. The device may identify a potential UL/DL imbalance scenario and select signal measurements associated with either a primary antenna or a diversity antenna for mobility procedures and/or mobility measurement reporting based on the detected imbalance. In one example, the device may receive a signal at both the primary and a diversity antenna and may identify an imbalance between the primary and diversity signal measurements. The device may then compare the identified imbalance with an imbalance threshold and may select the primary or diversity signal measurement for mobility procedures and/or measurement reporting based at least in part on the comparison. For instance, if the imbalance is greater than the imbalance threshold the device may use the primary signal measurements and may otherwise use the stronger of the primary or diversity signal measurements.

30 Claims, 7 Drawing Sheets

(51) Int. Cl.

| | |
|---|---|
| *H04B 7/00* | (2006.01) |
| *H04J 3/16* | (2006.01) |
| *H04W 24/10* | (2009.01) |
| *H04W 24/08* | (2009.01) |
| *H04L 12/26* | (2006.01) |
| *H04W 72/04* | (2009.01) |
| *H04W 36/00* | (2009.01) |

(52) U.S. Cl.
CPC ..... *H04W 36/0088* (2013.01); *H04W 72/042* (2013.01); *H04W 72/0413* (2013.01)

(56) References Cited

U.S. PATENT DOCUMENTS

| | | | |
|---|---|---|---|
| 2012/0134405 | A1 | 5/2012 | Dua et al. |
| 2013/0170416 | A1 | 7/2013 | Gopalan et al. |
| 2013/0308554 | A1 | 11/2013 | Ngai et al. |
| 2014/0092771 | A1* | 4/2014 | Siomina ............... H04W 24/08 370/252 |
| 2014/0098694 | A1 | 4/2014 | Damji et al. |
| 2014/0169197 | A1* | 6/2014 | Damnjanovic ....... H04W 48/18 370/252 |
| 2014/0185529 | A1* | 7/2014 | Lim ..................... H04W 8/005 370/328 |
| 2015/0065188 | A1 | 3/2015 | Nukala et al. |
| 2015/0092708 | A1 | 4/2015 | Su et al. |
| 2015/0318625 | A1* | 11/2015 | Nakamura ............ H01Q 21/28 343/876 |
| 2015/0319768 | A1* | 11/2015 | Abdelmonem ......... H04L 5/006 455/452.1 |
| 2016/0036508 | A1 | 2/2016 | Szini et al. |
| 2016/0094250 | A1 | 3/2016 | Mujtaba et al. |

\* cited by examiner

ENHANCED CONNECTION PERFORMANCE IN UL/DL IMBALANCE SCENARIOS

CROSS REFERENCES

The present application for Patent claims priority to U.S. Provisional Patent Application No. 62/214,199 by Mali et al., entitled "Enhanced Connection Performance in UL/DL Imbalance Scenarios," filed Sep. 3, 2015, assigned to the assignee hereof, and expressly incorporated by reference herein for any and all purposes.

BACKGROUND

Field of the Disclosure

The following relates generally to wireless communication, and more specifically to methods for addressing connection performance issues in uplink (UL)/downlink (DL) imbalanced scenarios.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). In some cases, a UE may be configured with multiple antennas (e.g., a primary antenna and a diversity antenna) and may include multiple receive chains for application of diversity techniques (e.g., receive diversity, transmit diversity, spatial diversity, etc.). The primary antenna may be coupled with a transmit chain and receive chain, while the diversity antenna may be coupled with a receive chain. The UE may measure signals received from a base station at both antennas and may use the signal measurements for mobility procedures and/or measurement reporting.

In some cases, the UE may select the stronger of the two signal measurements from the primary antenna or the diversity antenna for mobility procedures and/or measurement reporting. In some cases, the signal measurements made at the diversity antenna may be stronger than the signal measurements made at the primary antenna. For instance, the primary antenna may be impaired relative to the diversity antenna via blockage caused by handgrip, different antenna placement, different antenna materials, etc. In some cases, differences in signal transmission and reception via the primary and diversity antennas may affect mobility procedures and/or measurement reporting.

SUMMARY

A multi-antenna device configured for addressing connection performance issues in uplink (UL)/downlink (DL) imbalance scenarios is described. The multi-antenna device may identify a potential UL/DL imbalance scenario and select signal measurements associated with either a primary antenna or a diversity antenna for mobility reporting based on the imbalance scenario. In one example, the multi-antenna device may receive a signal at both the primary and a diversity antenna and may identify an imbalance between the primary and diversity signal measurements. The multi-antenna device may then compare the identified imbalance with an imbalance threshold and may select the primary or diversity signal measurement for mobility procedures and/or measurement reporting based at least in part on the comparison. For instance, if the imbalance is greater than the imbalance threshold the multi-antenna device may use the primary signal measurements, and may otherwise use the stronger of the primary or diversity signal measurements. In some cases, the multi-antenna device may also identify a communication mode, such as an idle or connected mode, for performing mobility procedures and/or measurement reporting.

A method of wireless communication is described. The method may include receiving, while in a connected mode with a serving cell of a base station, a signal via a first antenna and a second antenna of the user equipment, wherein the first antenna is associated with a transmit chain of the user equipment, identifying an imbalance between a first signal measurement of the signal received via the first antenna and a second signal measurement of the signal received via the second antenna, comparing the identified imbalance with an imbalance threshold, and selecting the first signal measurement or the second signal measurement for mobility event reporting based at least in part on a result of the comparison.

An apparatus for wireless communication is described. The apparatus may include means for receiving, while in a connected mode with a serving cell of a base station, a signal via a first antenna and a second antenna of the user equipment, wherein the first antenna is associated with a transmit chain of the user equipment, means for identifying an imbalance between a first signal measurement of the signal received via the first antenna and a second signal measurement of the signal received via the second antenna, means for comparing the identified imbalance with an imbalance threshold, and means for selecting the first signal measurement or the second signal measurement for mobility event reporting based at least in part on a result of the comparison.

A further apparatus for wireless communication is described. The apparatus may include a processor, memory in electronic communication with the processor, and instructions stored in the memory and operable, when executed by the processor, to cause the apparatus to receive, while in a connected mode with a serving cell of a base station, a signal via a first antenna and a second antenna of the user equipment, wherein the first antenna is associated with a transmit chain of the user equipment, identify an imbalance between a first signal measurement of the signal received via the first antenna and a second signal measurement of the signal received via the second antenna, compare the identified imbalance with an imbalance threshold, and select the first signal measurement or the second signal measurement for mobility event reporting based at least in part on a result of the comparison.

A non-transitory computer-readable medium storing code for wireless communication is described. The code may include instructions executable to receive, while in a connected mode with a serving cell of a base station, a signal via a first antenna and a second antenna of the user equipment, wherein the first antenna is associated with a transmit chain of the user equipment, identify an imbalance between a first signal measurement of the signal received via the first antenna and a second signal measurement of the signal received via the second antenna, compare the identified imbalance with an imbalance threshold, and select the first signal measurement or the second signal measurement for mobility event reporting based at least in part on a result of the comparison.

Some examples of the method, apparatuses, or non-transitory computer-readable medium described herein may further include processes, features, means, or instructions for determining that the first signal measurement is less than the second signal measurement by an amount greater than or equal to the imbalance threshold, and the first signal measurement is selected for the mobility event reporting. Additionally or alternatively, some examples may include processes, features, means, or instructions for triggering reporting of a mobility event based at least in part on a result of a comparison of the first signal measurement to one or more mobility reporting thresholds.

Some examples of the method, apparatuses, or non-transitory computer-readable medium described herein may further include processes, features, means, or instructions for selecting, based on the determining, a third signal measurement of a second signal from a non-serving cell received via the first antenna for utilization in the mobility event reporting. Additionally or alternatively, in some examples the selecting the first signal measurement or the second signal measurement for the mobility event reporting comprises determining that the first signal measurement is less than the second signal measurement by an amount greater than or equal to the imbalance threshold for a predetermined number of measurements.

Some examples of the method, apparatuses, or non-transitory computer-readable medium described herein may further include processes, features, means, or instructions for identifying the first signal measurement is below a signal measurement threshold, and the determining is based at least in part on identifying the first signal measurement is below a signal measurement threshold. Additionally or alternatively, in some examples the imbalance threshold is dynamically adjusted based at least in part on one or more of the first signal measurement, the second signal measurement, a mobility reporting threshold, or a mobility reporting hysteresis.

Some examples of the methods, apparatuses, or non-transitory computer-readable media described herein may further include processes, features, means, or instructions for addressing connection performance issues in UL/DL imbalance scenarios. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

Some examples of the methods, apparatuses, or non-transitory computer-readable media described herein may further include processes, features, means, or instructions for identifying a second imbalance between a third signal measurement of a second signal from a non-serving cell received via the first antenna and a fourth signal measurement of the second signal received via the second antenna; and selecting the third signal measurement or the fourth signal measurement for the mobility event reporting based on a result of a comparison of the second imbalance to a second imbalance threshold.

Some examples of the methods, apparatuses, or non-transitory computer-readable media described herein may further include processes, features, means, or instructions for determining that the third signal measurement is less than the fourth signal measurement by an amount greater than or equal to the second imbalance threshold; and wherein the third signal measurement is selected for the mobility event reporting.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
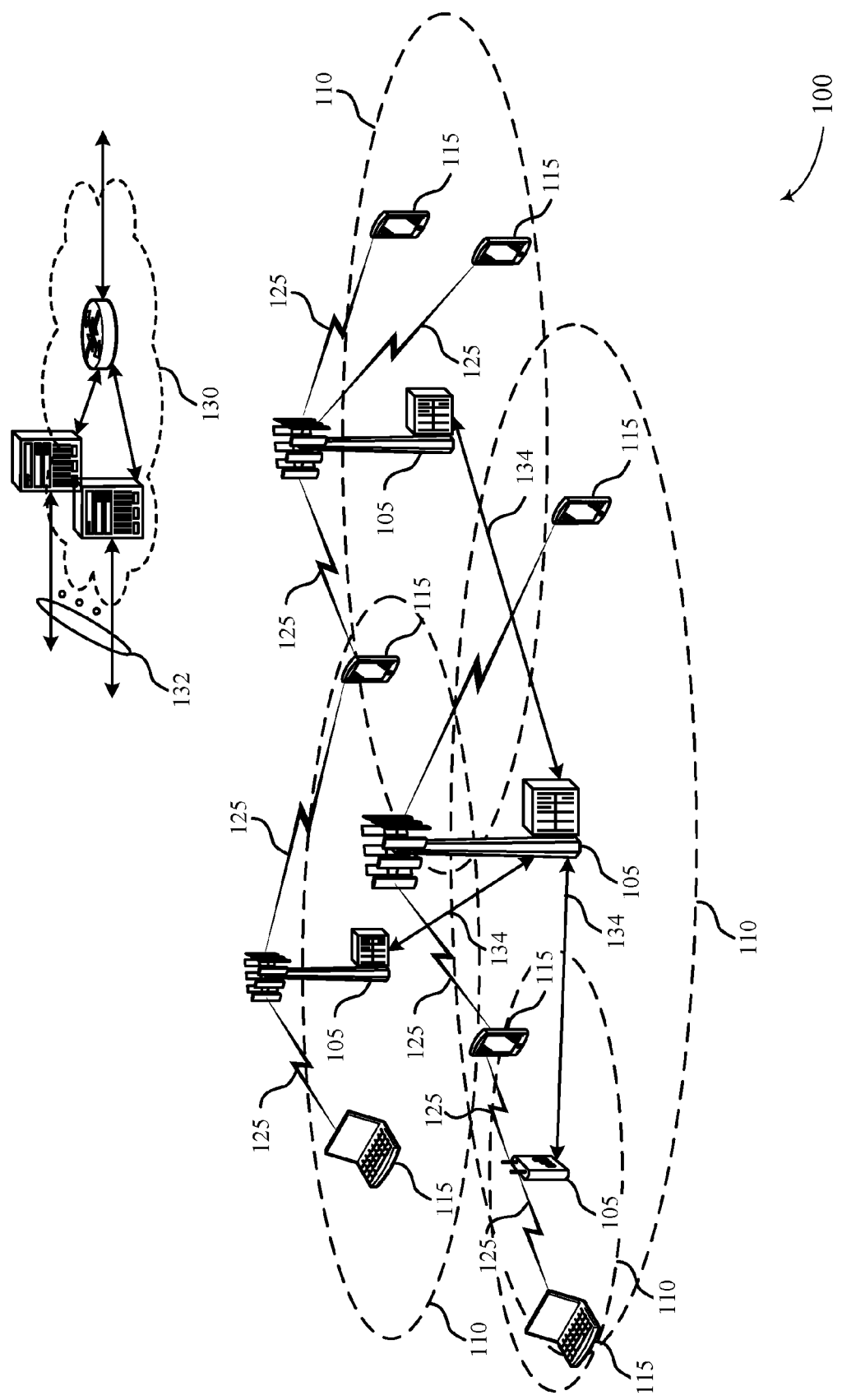
FIG. 1 illustrates an example of a wireless communications system that supports methods to address connection performance issues in UL/DL imbalance scenarios in accordance with various aspects of the present disclosure.

Techniques for addressing connection performance issues in uplink (UL)/downlink (DL) imbalance scenarios are disclosed. A multi-antenna device may identify an UL/DL imbalance between signal measurements associated with a primary antenna and a diversity antenna. The multi-antenna device may select a set of signal measurements from the signal measurements for mobility reporting to mitigate connection performance impact due to the UL/DL imbalance. Aspects of the disclosure are described in the context of a wireless communication system.

For example, a multi-antenna UE may be connected to a serving base station and may receive signals (e.g., synchronization signals, reference signals, etc.) from the serving base station or neighboring base stations for mobility reporting and operations (e.g., cell reselection, handover, etc.). The UE may include multiple antennas for application of diversity techniques (e.g., receive diversity, transmit diversity, spatial diversity, etc.). The multiple antennas may include a primary antenna and a diversity antenna, where the primary antenna may be coupled with a first receive chain and a transmit chain and the diversity antenna may be coupled with a second receive chain. In some cases, the UE may be configured with additional antennas, receive chains, and/or transmit chains. In some instances, the signal transmission/reception via the primary antenna is impaired (e.g., via handblock, etc.) and the UE may experience an UL/DL imbalance, during which the UE may receive signals from the serving or a neighbor base station but may fail to reliably transmit to the base station. According to described aspects, the UE may detect the potential UL/DL imbalance based on the signal measurements from the primary and diversity antennas and may select signal measurements to trigger mobility events and for mobility reporting to enhance mobility procedures such as handover, cell reselection, and/or single radio voice call continuity (SRVCC) operations.

In one example, a UE may receive a signal (e.g., synchronization or reference signal from a serving or a neighboring base station, etc.) at both a primary and a diversity antenna. The UE may determine separate primary and diversity signal measurements of the signal via the primary and diversity antennas, respectively. The UE may then identify an imbalance between the primary and diversity signal measurements and compare the identified imbalance with an imbalance threshold. If the identified imbalance is greater than or equal to the imbalance threshold, the UE may choose to use the primary signal measurements for mobility procedures and/or reporting. If the identified imbalance is below the imbalance threshold, the UE may use the stronger signal measurement between the primary and diversity signal measurements for mobility procedures and/or reporting.

In some cases, determining whether to use the primary signal measurements for mobility procedures and/or reporting, instead of the stronger of the primary and diversity signal measurements, may further be based on whether the primary signal measurement is below a signal measurement threshold. The selected signal measurement may be used in idle mode for cell reselection or in connected mode for triggering of mobility reporting events (e.g., mobility events A2, A3, etc.). These and other aspects of the disclosure are further illustrated by and described with reference to apparatus diagrams, system diagrams, and flowcharts.

FIG. 1 illustrates an example of a wireless communications system 100 that supports methods to address connection performance issues in UL/DL imbalance scenarios in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include UL transmissions from a UE 115 to a base station 105, or DL transmissions, from a base station 105 to a UE 115. The base stations 105 may support, and may communicate with one another. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105. A UE 115 may be configured with multiple antennas and, in some cases, may use the multiple antennas for transmit/receive operations. In some cases, the UE 115 may be configured with a primary antenna and one or more diversity antennas, where the primary antenna may be coupled with a first receive chain and a transmit chain, and a diversity antenna may be coupled with a second receive chain. Therefore, the primary antenna may be used for reception and transmission of incoming and outgoing signals, while the diversity antenna may be used to improve reception performance, but not for transmission.

In certain scenarios, the primary antenna and diversity antenna may experience different channel conditions due to different antenna placement, different antenna materials, positioning of a user's hand (e.g., handblock), and the like. In some instances, signal measurements associated with the primary antenna may be degraded relative to signal measurements associated with a diversity antenna. Furthermore, transmissions from the primary antenna may also be attenuated. This may result in an UL/DL imbalance at the UE 115 as signals may be received at the UE 115 with greater range than signals transmitted from the UE 115. This UL/DL imbalance may impair call quality (e.g., result in dropped calls) and increase power consumption at the UE 115 (e.g., by increasing transmit power).

In some cases, the UE 115 uses signal measurements (e.g., reference signal received power (RSRP), reference signal received quality (RSRQ), received signal strength indicator (RSSI), etc.) of signals received at the UE 115 for mobility procedures, such as cell reselection and/or measurement reporting. In some cases, a base station 105 may use a measurement report for mobility procedures such as handover and single radio voice call continuity (SRVCC). Handover and SRVCC are network assisted procedures used for UEs 115 that are in a connected mode, while UEs 115 may autonomously perform cell reselection in an idle mode. In some cases, certain mobility events (e.g., events A1 to A5, B1, and/or B2) may be triggered by comparing the measured signals with mobility event thresholds. For instance, event A2 may be triggered based on a comparison of a signal measurement associated with the serving cell, such as RSRP, against a threshold value with hysteresis and may be triggered when $MEAS_{serv}+Hyst<Threshold$ is satisfied. In another instance, event B2 may compare the serving cell measurements with a neighboring inter-network cell, and may be triggered when $MEAS_{serv}+Hyst<Threshold\_1$ and when $MEAS_{neigh}+Offset_{neigh,freq}-Hyst>Threshold\_2$ are satisfied. In some cases, the UE 115 is statically configured to use the signal measurements associated with the antenna that receives the strongest signal for mobility procedures and/or measurement reporting. However, when the primary antenna is impaired, using diversity signal measurements may delay mobility procedures and may result in prolonged UL/DL imbalance at the UE 115. In such scenarios, a UE 115 may experience dropped calls or otherwise reduced call quality.

In one example, the signal measurements taken at the diversity antenna may be stronger than those taken at the primary antenna. This may create a scenario in which a UE 115 may receive signals from a base station 105 but may not reliably transmit to the base station 105. Using the stronger signal measurements may delay handover and cell reselection operations as the stronger measurements may take longer to trigger mobility events in relation to the primary signal measurements. For instance, the UE 115 may continue to receive a signal via the diversity antenna at measurement levels (e.g., RSRP, RSRQ, RSSI, etc.) that are greater than a mobility threshold while the signal received via the primary antenna has measurement levels below the threshold value. Accordingly, mobility procedures may be delayed, and the UE 115 may remain connected to a base station 105, despite failing to reliably transmit to the base station 105 via the primary antenna.

According to disclosed aspects, a multi-antenna UE 115 may be configured for enhanced mobility measurement and reporting using dynamically selected signal measurements. In examples, the UE 115 may receive, while in a connected mode, a signal at both the primary and the diversity antennas and may identify an imbalance between the primary and diversity signal measurements. The UE 115 may then compare the identified imbalance with an imbalance threshold and may select the signal measurement associated with either the primary or diversity signal measurements for mobility procedures and/or measurement reporting based at least in part on the comparison. For instance, if the imbalance is greater than the imbalance threshold, the UE 115 may use the primary signal measurements, and otherwise may use the stronger of the primary and diversity signal measurements. In some cases, the UE 115 may also identify an active communication mode, such as an idle or connected mode, for performing mobility procedures and/or measurement reporting. In this way, the UE 115 may use the primary signal measurements to trigger mobility procedures in the idle mode (e.g., cell reselection), and/or measurement reporting for connected mode mobility procedures (e.g., handover, SRVCC handover, etc.), with decreased latency when an UL/DL imbalance is present and may increase the reliability of mobility procedures.

Figure 2:
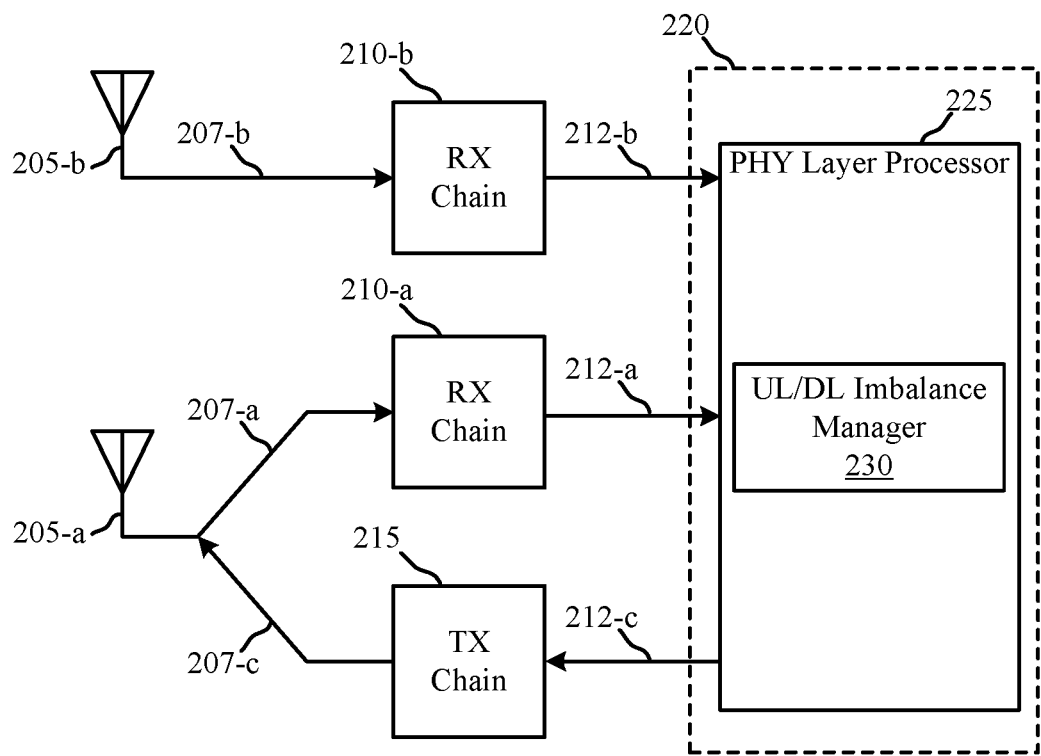
FIG. 2 illustrates an example of a multi-antenna device for addressing connection performance issues in UL/DL imbalance scenarios in accordance with various aspects of the present disclosure.

FIG. 2 illustrates an example of a multi-antenna device 200 for addressing connection performance issues in UL/DL imbalance scenarios in accordance with various aspects of the present disclosure. Multi-antenna device 200 may be an example of a UE 115 as described above with reference to FIG. 1. Multi-antenna device 200 may include antennas 205, receive chains 210, transmit chains 215, and communications component 220. Multi-antenna device 200 may include a primary antenna 205-*a* and a diversity antenna 205-*b*. Primary antenna 205-*a* may be coupled to receive chain 210-*a* and transmit chain 215, while diversity antenna 205-*b* may be coupled to receive chain 210-*b*. Communications component 220 may include a physical (PHY) layer processor 225, which may include an UL/DL imbalance manager 230.

In one example, the multi-antenna device 200 may be in a connected mode and receive signals (synchronization signals, reference signals, etc.) via primary antenna 205-*a* and diversity antenna 205-*b*. The signals are then passed via communication paths 207-*a* and 207-*b* to receive chains 210-*a* and 210-*b*, which may include analog components (e.g., amplifiers, filters, etc.), analog-to-digital converters, baseband processing, etc. Separate signal measurements for the signals received at antennas 205-*a* and 205-*b* are generated at PHY layer processor 225, which may receive post-processed (e.g., filtered, digitized, descrambled, demodulated, etc.) signals from receive chains 210-*a* and 210-*b* via communication paths 212-*a* and 212-*b*. In some cases, UL/DL imbalance manager 230 may compare signal measurements associated with the primary antenna 205-*a*, or "primary signal measurements," and signal measurements associated with diversity antenna 205-*b*, or "diversity signal measurements" to identify an imbalance between the two measurements. When the primary signal measurement is weaker than the diversity signal measurement by an amount greater than an imbalance threshold, UL/DL imbalance manager 230 may select the primary signal measurements for mobility reporting (e.g., for triggering mobility events, such as events A1, A2, B2, etc.). When the primary signal measurement is not weaker than the diversity signal measurement by an amount greater than the imbalance threshold the strongest signal measurements of the primary and diversity signal measurements may be used for mobility reporting.

In some cases, UL/DL imbalance manager 230 may also compare the primary signal measurement with a signal measurement threshold prior to or concurrently with comparing the primary signal measurements with the diversity signal measurement. And the UL/DL imbalance manager 230 may select the primary signal measurements for mobility reporting when both the primary signal measurement is below the signal measurement threshold and the primary signal measurement is weaker than the diversity signal measurement by an amount greater than the imbalance threshold. Upon triggering of a mobility event, the multi-antenna device 200 may report the mobility event to the serving base station, which may result in a mobility procedure occurring, such as handover to a different base station.

The signal measurement and imbalance thresholds may be dynamically adjusted based at least in part on one or more of the primary signal measurement, the diversity signal measurement, a mobility reporting threshold, mobility reporting hysteresis, known network information, etc. For instance, the signal measurement and imbalance thresholds may be set based at least in part on the number of and/or density of base stations located in a certain region. In one example, the imbalance threshold may be decreased based on identifying lower primary signal measurements. In some examples, the imbalance threshold may be set as a percentage (e.g., 10%, 20%, etc.) of the primary signal measurement. Although multi-antenna device 200 is illustrated with a single diversity antenna 205-*b*, a multi-antenna device 200 may have multiple diversity antennas 205-*b*, in some cases.

Transmit chain 215 may include analog components (e.g., power amplifiers, filters, mixers, etc.), a digital-to-analog converter, baseband processing, etc., for transmissions to the base station. Transmit chain 215 may receive data/signals from PHY layer processor 225 via communication path 212-*c* for transmission to another device, and may pass post-processed (mixed, analog-converted, scrambled, modulated, etc.) signals to primary antenna 205-*a* via communication path 207-*c*. In cases of UL/DL imbalance, the receive/transmit path between the primary antenna and a base station may be degraded. That is, the multi-antenna device 200 may capable of receiving signals from another device, but may not be capable of transmitting signals to the other device. In some cases, the power used by transmit chain 215 may be increased to maintain the reliability of UL transmissions to the serving base station. However, the multi-antenna device 200 may have a limited power headroom, and per-resource transmission power may be reduced as the transmission bandwidth increases. An increase in power at the transmit chain 215 may also increase the power consumed at the multi-antenna device 200. By identifying the UL/DL imbalance and using the weaker primary signal measurements, the multi-antenna device 200 may be prompted to search for and/or move to a preferred cell with reduced latency relative to the diversity signal measurements. Once connected to a preferred cell, the multi-antenna device 200 may decrease the power consumption at the transmit chain 215 and/or experience increased transmission reliability.

Figure 3:
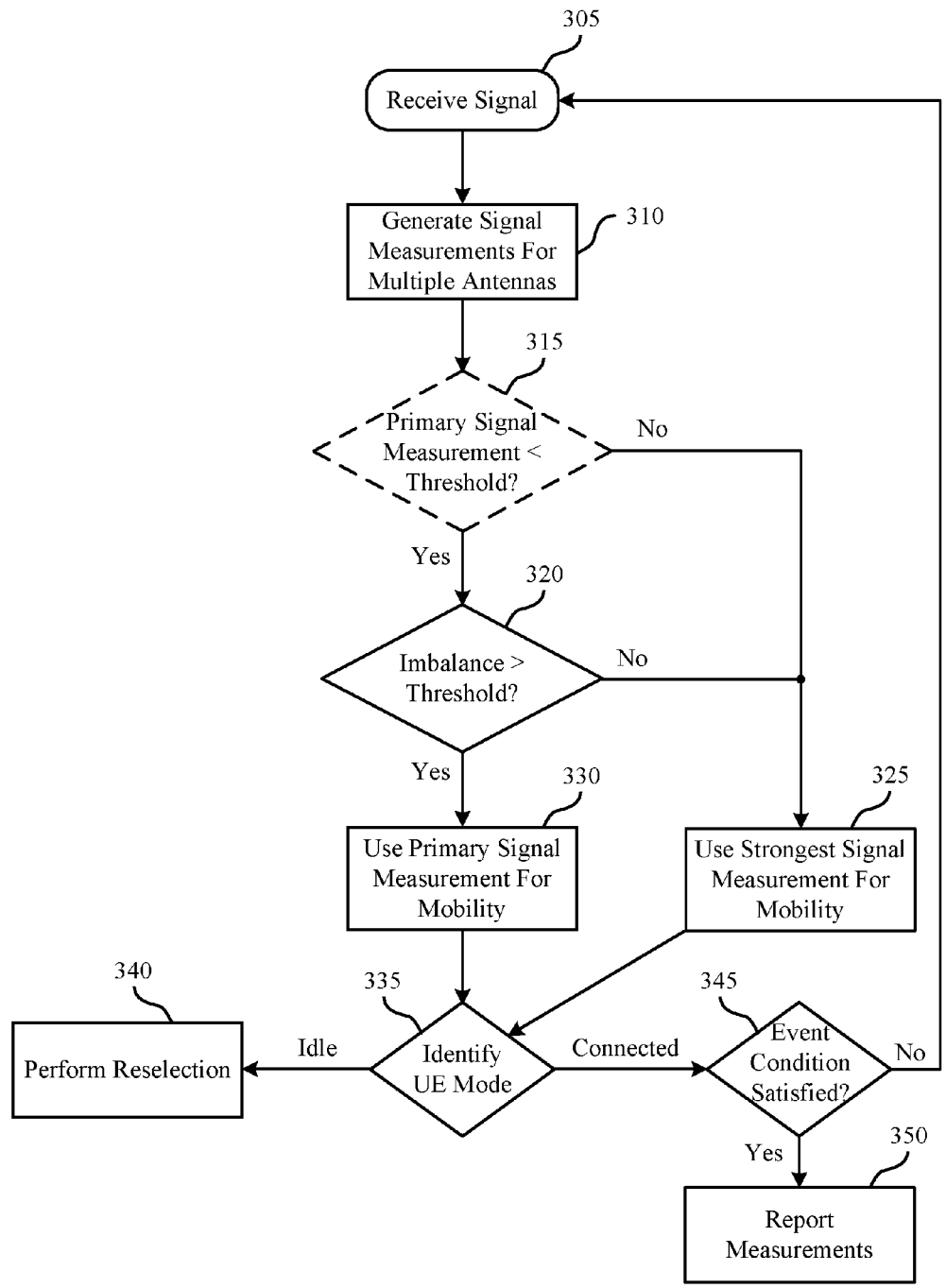
FIG. 3 illustrates an example of a flow chart for addressing connection performance issues in UL/DL imbalance scenarios in accordance with various aspects of the present disclosure.

FIG. 3 illustrates an example of a flow chart 300 for addressing connection performance issues in UL/DL imbalance scenarios in accordance with various aspects of the present disclosure. Flow chart 300 may be performed by a device such as a UE 115 or multi-antenna device 200 as described above with reference to FIGS. 1-2. In some examples, a multi-antenna UE may determine whether to use primary or diversity signal measurements for mobility procedures and/or measurement reporting based at least in part on a received signal, as described below.

At step 305, the UE may receive a signal from a base station (e.g., serving base station, neighboring base station, etc.) at both the diversity and the primary antenna. The signal may include data or control signals, synchronization signals, reference signals, and the like. In some cases, an obstruction such as the user's hand may impair reception via the primary antenna to a greater degree than via the diversity antenna. By using multiple antennas for receiving the signal, the UE may increase its receive range. For example, the signals received at the diversity and primary antenna may be combined in later processing (e.g., receive diversity) to reconstruct the signal transmitted from the base station with higher signal to noise ratio (SNR) than either or both of the individual signals.

At step 310, the UE may generate signal measurements for the primary antenna and the diversity antenna. The signal measurements may include RSRP, RSRQ, RSSI, etc., which may be used for mobility event operations and uplink transmit power determinations. The UE may generate separate signal measurements (e.g., primary signal measurements and diversity signal measurements) for the received signal from the primary and diversity antennas. The UE may perform filtering (e.g., layer-3 filtering) of the primary and diversity signal measurements. And in some cases, the UE may increase or decrease transmit power based at least in part on the primary signal measurements.

At step 315, the UE may determine whether the primary signal measurements are below the signal measurement threshold. In some cases, the signal measurement threshold may be determined semi-statically (e.g., based at least in part on known network conditions) or dynamically (e.g., based at least in part on signal measurements, reporting hysteresis, etc.). In some cases, the UE may wait for the primary signal measurements to stay below the signal measurement threshold for a predetermined duration of time before triggering additional operations. If the primary measurements are not below the threshold, the UE may move to step 325, otherwise the UE may move to step 320. In some cases, the UE may refrain from determining whether the primary signal measurements are below a signal measurement threshold (e.g., step 315 may be skipped).

At step 320, the UE may determine whether the imbalance between the primary signal measurement and the diversity signal measurement exceeds the imbalance threshold (e.g., the primary signal measurement is less than the diversity signal measurement by an amount greater than the imbalance threshold). In some cases, the UE determines whether an imbalance is present by subtracting the primary signal measurement from the diversity signal measurements to obtain a measurement imbalance, and comparing the measurement imbalance with the imbalance threshold. The imbalance threshold may be determined semi-statically (e.g., configured by the network, based at least in part on known network conditions) or dynamically (e.g., based at least in part on signal measurements, reporting hysteresis, etc.). If an imbalance is detected, the UE may proceed to step 330. In some cases, the UE may wait for the measured imbalance to be greater than the imbalance threshold for a predetermined duration of time before triggering the transition to step 330. If an imbalance is not detected, the UE may proceed to step 325.

At step 325, the UE selects the stronger of the primary and the diversity signal measurements for mobility procedures and/or measurement reporting. The UE then proceeds to step 335.

At step 330, the UE selects the primary signal measurement for mobility procedures and/or measurement reporting. The UE then proceeds to step 335.

At step 335, the UE may identify the current mode of operation (e.g., idle or connected). At step 340, if the UE determines the device is operating in an idle mode, the UE uses the selected signal measurement, as determined from steps 325 or 330, for cell reselection operations. For instance, the UE may be triggered to generate signal measurements for neighboring cells based on comparing the selected signal measurement for the serving cell (e.g., the weaker primary signal measurements) to a cell reselection measurement trigger threshold. In some cases, the UE may make neighboring cell signal measurements if the selected signal measurement for the serving cell is less than the cell reselection measurement trigger threshold. The antenna used for neighboring cell signal measurements may depend on the selected signal measurement at steps 325 or 330. For example, when the primary signal measurement has been selected (e.g., at step 330) to trigger the cell reselection measurement threshold, then measurements of neighboring cell signals received via the primary antenna may be compared with the selected primary signal measurement. And the result of the comparison may be used for selecting a new cell.

Alternatively, the selected antenna for neighboring cell signal measurements may be determined based on detection of an imbalance for the neighboring cell. For example, the UE may perform operations similar to steps 305 to 330 to select which neighboring signal measurements to use for triggering of mobility events (e.g., A3, B2, etc.). For instance, the UE may determine if an imbalance between the primary and secondary antenna is greater than a second imbalance threshold (which may be the same or a different threshold) for the neighboring signal measurements. If an imbalance is identified, the UE may use the signal measurement of the neighboring signal received via the primary antenna. If not, the UE may use the stronger of the primary or diversity signal measurements of the neighboring signal to compare with the signal measurement selected at 325 or 300 for triggering mobility events for cell reselection.

At step 345, if the UE is operating in a connected mode, the UE may determine whether the selected signal measurement satisfies a mobility event condition. For instance, if the selected signal measurement for the serving cell (plus hysteresis) is less than the threshold for the A2 mobility event, reporting of the A2 event may be triggered at step 350. For mobility event reporting based on both serving and non-serving cells, the antenna used for neighboring cell signal measurements may depend on the selected signal measurement at steps 325 or 330. For example, where the primary signal measurement is selected for comparison to the mobility event threshold, neighboring cell signal measurements for mobility event reporting may also be made based on neighboring cell signals received via the primary antenna for comparing to the primary signal measurement. The result of the comparison may be used for mobility event reporting.

Alternatively, the selected antenna for neighboring cell signal measurements may be determined based on detection of an imbalance for the neighboring cell. For example, the UE may perform operations similar to steps 305 to 330 to select which neighboring signal measurements to use for triggering of mobility events (e.g., A3, B2, etc.). For instance, the UE may determine if an imbalance between the primary and secondary antenna is greater than a second imbalance threshold (which may be the same or a different threshold) for the neighboring signal measurements. If an imbalance is identified, the UE may use the signal measurement for the neighboring signal received via the primary antenna, and if not, the UE may use the stronger of the primary or diversity signal measurements of the neighboring signal for mobility event reporting. Where no mobility reporting events are triggered at step 345, the UE may proceed to receive additional signals at step 305.

At 350, if the UE determines the mobility event condition has been satisfied, the UE may report the mobility reporting event to the serving base station. In some cases, the base station may use the mobility reporting event for triggering a mobility procedure (e.g., handover, etc.). For conditions where the imbalance is greater than the imbalance threshold (and optionally the primary signal measurements is below the signal measurement threshold), mobility event reporting based on primary signal measurements may expedite handover procedures relative to the diversity signal measurements. In some cases, the UE may repeat (e.g., periodically) the foregoing process for subsequent signal measurements at the antennas by returning to step 305 to receive additional signals.

The foregoing provides one example of a flow chart for addressing connection performance issues in UL/DL imbalance scenarios. In other examples, one or more of the above steps may be performed in an alternative order, concurrently with other features, or omitted from the process.

Figure 4:
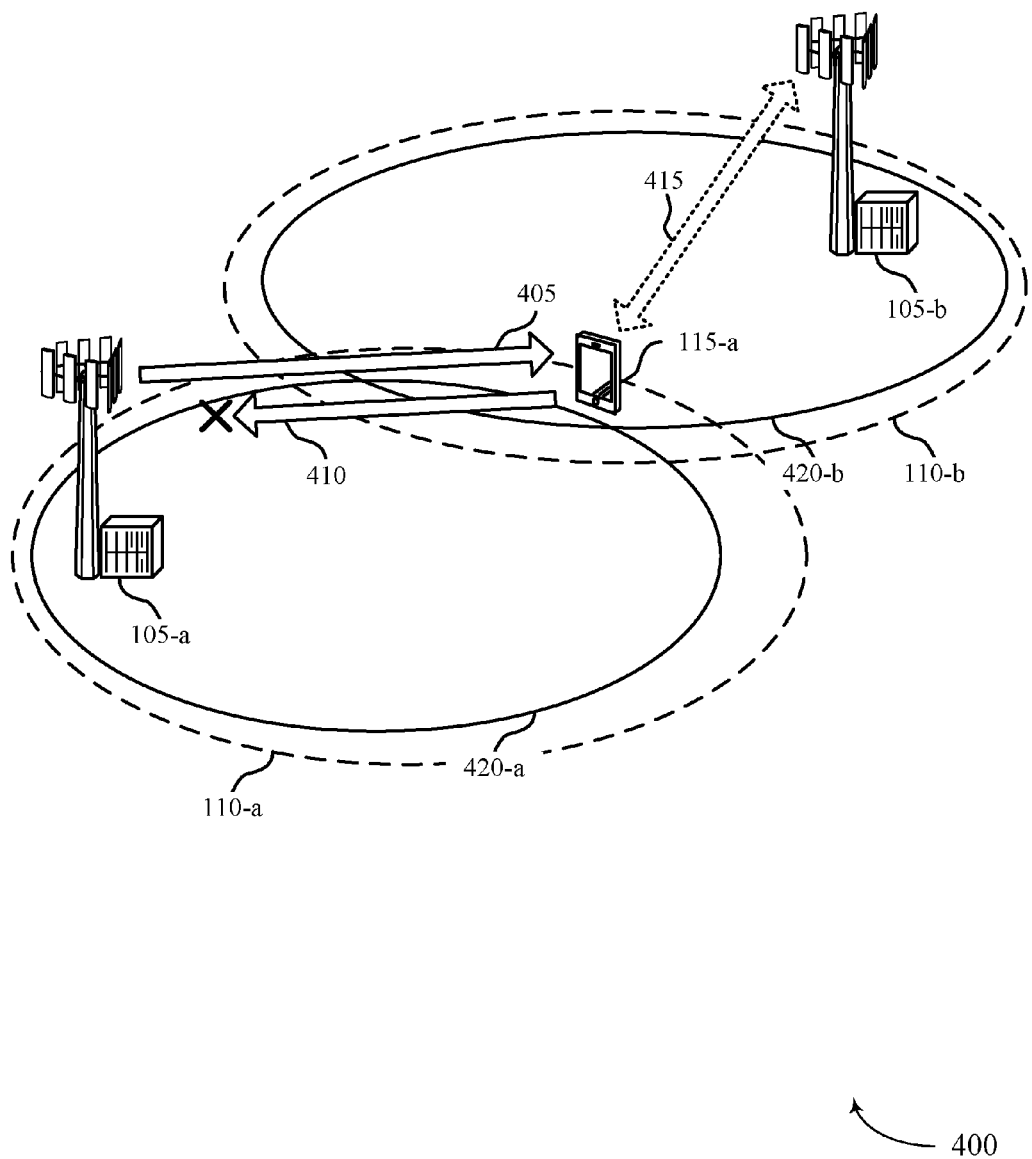
FIG. 4 illustrates an example of a wireless communications subsystem that supports methods to address connection performance issues in UL/DL imbalance scenarios in accordance with various aspects of the present disclosure.

FIG. 4 illustrates an example of a wireless communications subsystem 400 that supports methods to address connection performance issues in UL/DL imbalance scenarios in accordance with various aspects of the present disclosure. Wireless communications subsystem 400 may include UE 115-a, base station 105-a, and base station 105-b, which may be examples of a UE 115 or a base station 105 and may communicate with one another as described above with reference to FIG. 1-2. In some examples, UE 115-a may have a primary antenna coupled to a transmit chain and a receive chain, and a diversity antenna coupled to a second receive chain. Thus the UE 115-a may be configured to transmit signals on an uplink 410 via the primary antenna and receive signals on a downlink 405 via the primary antenna and/or the diversity antenna.

In one example, UE 115-a may be connected to and communicating with base station 105-a via downlink 405 and uplink 410. In certain scenarios, the primary antenna may be impaired and the quality of the signals transmitted over downlink 405 may be degraded at the primary antenna relative to the diversity antenna (e.g., due to handblock, antenna placement, different materials, etc.). Accordingly, UE 115-a may be capable of receiving communications from base station 105-a within geographic coverage area 110-a (e.g., by using the diversity antenna or by combining signals received at the primary and diversity antennas); however, UE 115-a may not reliably transmit to base station 105-a outside of transmission coverage area 420-a.

UE 115-a may detect the UL/DL imbalance based upon a comparison of the primary signal measurements with the diversity signal measurements. If the UE 115-a identifies that the diversity signal measurements are greater than the primary signal measurements by an amount greater than the imbalance threshold, the UE 115-a may use the primary signal measurements for mobility procedures, which may include mobility reporting event triggering in connected mode or cell reselection in idle mode. In some cases, UE 115-a may only identify the UL/DL imbalance condition after determining the primary signal measurements are below a signal measurement threshold.

UE 115-a may also be within communication range of base station 105-b and may be capable of both receiving and reliably transmitting to base station 105-b, as indicated by transmission coverage area 420-b. In this example, the UE 115-a may monitor the primary signal measurements for mobility reporting, and may determine that the primary signal measurements have fallen below a mobility event threshold (e.g., events A1 to A5, B1, and/or B2). Accordingly, UE 115-a may report mobility event information to base station 105-a. In this example, UE 115-a may report that a mobility reporting event (e.g., A2, B2, etc.) has been triggered, and base station 105-a may use the mobility event reporting to trigger mobility procedures (e.g., update of neighbor cell information, handover UE 115-a to base station 105-b, etc.). Upon receiving a handover command to connect to base station 105-b, UE 115-a may then begin communicating with base station 105-b via communication link 415. By using the weaker primary signal measurements, UE 115-a may accelerate the handover determination by base station 105-a relative to the stronger diversity signal measurements. In this way, power consumption at UE 115-a may be reduced as UE 115-a may move to a stronger cell (e.g., a cell with a stronger signal, better geometry, etc.) with reduced latency. For instance, the primary signal measurements may meet mobility event A2 earlier relative to the stronger diversity signal measurements. In the case of SRVCC handover, UE 115-a may move to a preferred cell (e.g., a cell within transmission range at lower transmission power levels) with reduced latency and thereby maintain call continuity or reduce disruptions in call quality. For instance, the primary signal measurements may meet mobility event A2 criteria earlier, which may enable the network to configure mobility event B2 sooner.

In the case where UE 115-a is in the idle state, the UE 115-a may use the selected signal measurement based on the detection of the UL/DL imbalance to trigger a search for other cells (e.g., the cell associated with base station 105-b). If the signal measurements associated with another cell meet certain criteria (e.g., greater than the serving cell, greater than a threshold, etc.), then UE 115-a may select and camp on the cell for communications. For instance, UE 115-a may determine that the cell associated with base station 105-b is a reselection candidate and may connect to and, upon entering a connected mode, begin communicating with base station 105-b via communication link 415. Where the primary signal measurement is weaker than the diversity signal measurement, the search for other cells may be selected sooner, allowing the UE 115 to more quickly find and camp on a better cell associated with base station 105-b.

Figure 5:
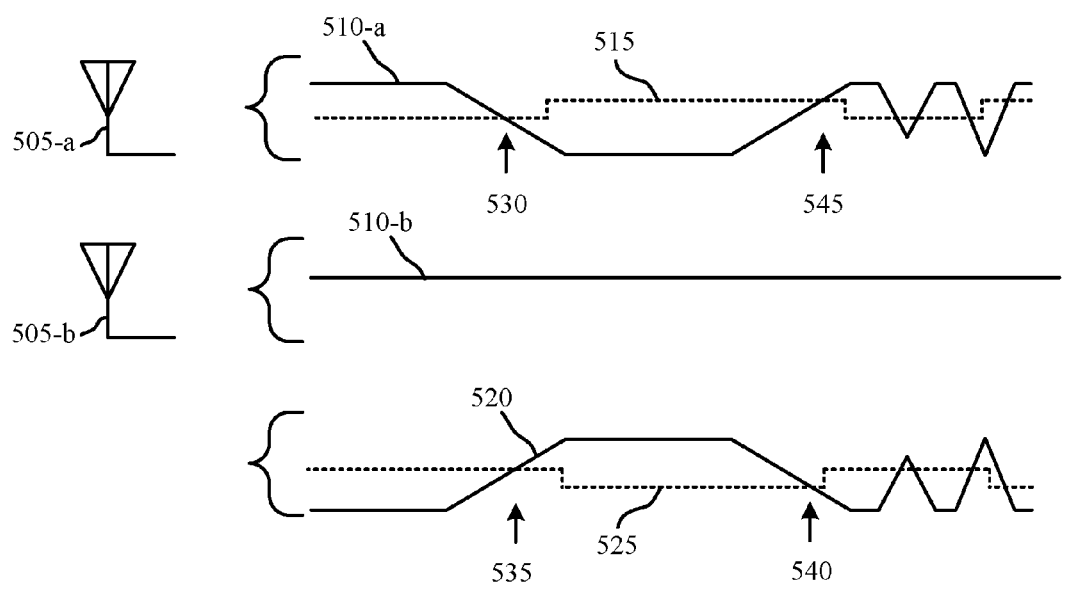
FIG. 5 illustrates a timing diagram that supports methods to address connection performance issues in UL/DL imbalance scenarios in accordance with various aspects of the present disclosure.

FIG. 5 illustrates a timing diagram 500 showing an example of addressing connection performance issues in UL/DL imbalance scenarios in accordance with various aspects of the present disclosure. Timing diagram 500 may show operation of a device such as a UE 115 as described above with reference to FIGS. 1, 2, and 4. In one example, a UE may receive a signal at primary antenna 505-a and diversity antenna 505-b. Primary signal measurement 510-a may be associated with primary antenna 505-a and timing diagram 500 depicts changes in the primary signal measurement 510-a over time. Diversity signal measurement 510-b may be similarly associated with diversity antenna 505-b. Imbalance measurement 520 may be associated with the difference between primary signal measurement 510-a and diversity signal measurement 510-b. Signal measurement threshold 515 and imbalance threshold 525 may be used by a UE to determine which signal measurements to use for mobility procedures and/or measurement reporting.

Prior to time 530 in the example shown in timing diagram 500, the primary signal measurement 510-a is greater than the signal measurement threshold 515 and the UE uses the stronger of the primary signal measurement 510-a or the diversity signal measurement 510-b for mobility procedures, mobility event triggering, and/or measurement reporting. Over time primary antenna 505-a may be impaired and primary signal measurement 510-a decreases, and at 530, the primary signal measurement 510-a may fall below signal measurement threshold 515, while diversity signal measurement 510-b is unchanged. In this case, the UE may experience UL/DL imbalance as the UE may receive signals over diversity antenna 505-b, but may fail to reliably transmit to a base station via primary antenna 505-a, as generally described with reference to FIG. 4. In some cases, the UE may detect for the primary signal measurement 510-a to be below signal measurement threshold 515 for a duration of time. Comparison of the primary signal measurement 510-a to the signal measurement threshold 515 may additionally include hysteresis (e.g., hysteresis may be added to the signal measurement threshold 515 after the primary signal measurement 510-a falls below the signal measurement threshold 515). After detection of the primary signal measurement 510-a being below signal measurement threshold 515, the UE may determine whether the imbalance measurement 520 between the primary and diversity signal measurements 510-a and 510-b is greater than an imbalance threshold 525.

At time 535, the UE may identify that the imbalance measurement 520 has surpassed an imbalance threshold 525 (e.g., diversity signal measurement 510-b is greater than primary signal measurement 510-a by more than the imbalance threshold 525). The UE may similarly wait a duration of time before acknowledging the imbalance threshold 525 has been met, and the imbalance threshold 525 may also include hysteresis. After determining that both the signal measurement and imbalance threshold have been met, the UE may select the primary signal measurement 510-a to trigger mobility reporting events and/or to initialize mobility procedures. For instance, the UE may use the primary signal measurement 510-a to determine whether mobility reporting event conditions have been satisfied. At time 540, the imbalance measurement 520 may fall below the imbalance threshold 525 and the UE may use the stronger of the primary signal measurement 510-a or diversity signal measurement 510-b for mobility procedures and/or measurement reporting. At time 545, the primary signal measurement may rise above the signal measurement threshold 515 and the UE may halt monitoring imbalance measurement 520 until the signal measurement threshold 515 is again satisfied.

Figure 6:
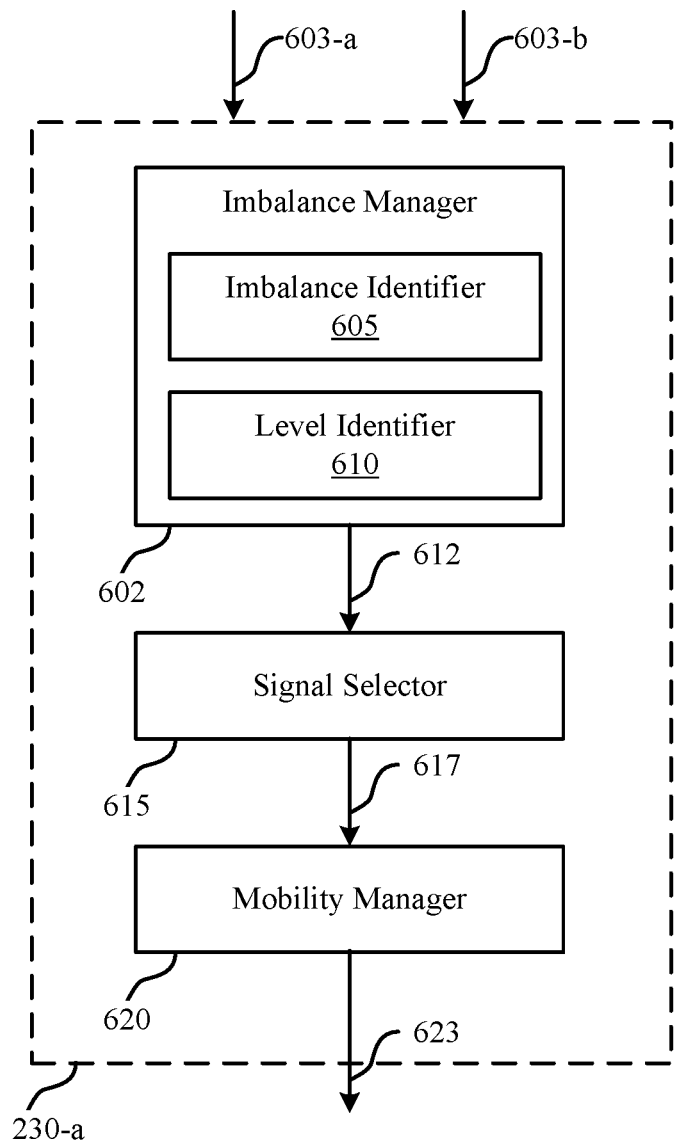
FIG. 6 shows a block diagram of a UL/DL imbalance manager for addressing connection performance issues in UL/DL imbalance scenarios in accordance with various aspects of the present disclosure.

FIG. 6 shows a block diagram 600 of a UL/DL imbalance manager 230-a which may be a component of a multi-antenna device 200 for addressing connection performance issues in UL/DL imbalance scenarios in accordance with various aspects of the present disclosure. The UL/DL imbalance manager 230-a may be an example of aspects of a UL/DL imbalance manager 230 described with reference to FIGS. 2-5. The UL/DL imbalance manager 230-a may include an imbalance manager 602, an imbalance identifier 605, a level identifier 610, a signal selector 615, and a mobility manager 620.

The UL/DL imbalance manager 230-a may receive a first signal/signal measurement 603-a from a primary antenna and a second signal/signal measurement 603-b from a diversity antenna. In some cases, the signal measurements 603 may be passed to any of the imbalance manager 602, an imbalance identifier 605, a level identifier 610, a signal selector 615, and/or the mobility manager 620. Each of the components may use the signal measurements in subsequent operations, as discussed below.

The imbalance manager 602 may include an imbalance identifier 605 and a level identifier 610. The imbalance identifier 605 may identify an imbalance between a first signal measurement of a signal received via a first antenna (e.g., signal measurement 603-a from the primary antenna) and a second signal measurement of the signal received via a second antenna (e.g., signal measurement 603-b from the diversity antenna) as described with reference to FIGS. 2-5. For instance, the imbalance identifier 605 may determine that the first signal measurement is less than the second signal measurement by an amount greater than or equal to the imbalance threshold—e.g., by comparing the identified imbalance (e.g., a magnitude of the imbalance, an indication that an imbalance has been identified, an index associated with a magnitude of the imbalance, etc.) with an imbalance threshold. In some examples, the imbalance threshold may be dynamically adjusted based at least in part on one or more of the first signal measurement, the second signal measurement, a mobility reporting threshold, or a mobility reporting hysteresis. The imbalance identifier 605 may additionally identify a second imbalance between a third signal measurement of a second signal from a non-serving cell (e.g., a neighboring cell) received via the first antenna and a fourth signal measurement of the second signal received via the second antenna.

The level identifier 610 may identify whether the first signal measurement is below a signal measurement threshold—e.g., by comparing a magnitude of the first signal measurement with a signal measurement threshold. The imbalance manager 602 may pass one or more results 612 of the above comparisons associated with the identified imbalance to the signal selector 615.

The signal selector 615 may select signal measurements for mobility event reporting based at least in part on the received result 612 as described with reference to FIGS. 2-5. For a serving cell, a signal measurement from a primary antenna (e.g., the first signal measurement 603-a) may be selected for the mobility event reporting (e.g., if an imbalance condition is detected and/or the first signal measurement is below the signal measurement threshold). In some examples, selecting the signal measurement for the serving cell (e.g., the first signal measurement 603-a from the primary antenna or the second signal measurement 603-b from the diversity antenna) for the mobility event reporting is based on receiving a result 612 from the imbalance identifier 605 indicating that the first signal measurement 603-a has been less than the second signal measurement 603-b by an amount greater than or equal to the imbalance threshold for a predetermined number of measurements. In some examples, selecting the first signal measurement 603-a may be based at least in part on the level identifier 610 indicating that the first signal measurement 603-a is below a signal measurement threshold in addition to the imbalance identifier 605 indicating that an imbalance is detected between the first signal measurement and the second signal measurement. For neighboring cell measurements, the signal selector 615 may also select a signal measurement of a neighboring cell from the primary antenna (e.g., a third signal measurement) for mobility event operations based on the imbalance identifier 605 determining that the signal measurement from the primary antenna is less than a signal measurement of the neighboring cell from the diversity antenna (e.g., a fourth signal measurement) by an amount greater than or equal to a second imbalance threshold. The signal selector 615 may pass the selected signal measurements 617 to mobility manager 620 as described with reference to FIGS. 2-5.

The mobility manager 620 may trigger reporting of mobility events based at least in part on a comparison of the selected signal measurements 617 to one or more mobility reporting thresholds, as described with reference to FIGS. 2-5. For instance, where the selected signal measurement 617 for the serving cell (plus hysteresis) is less than the threshold for the A2 mobility event, reporting of the A2 event may be triggered. Additionally or alternatively, mobility manager 620 may trigger reporting of mobility events based on the serving cell and neighboring cell signal measurements (e.g., A3, B2, etc.) based on the selected signal measurements 617. Mobility manager 620 may pass a mobility reporting event 623 to a transmitter (e.g., via PHY layer processor 225), which may transmit the mobility event to a base station.

Figure 7:
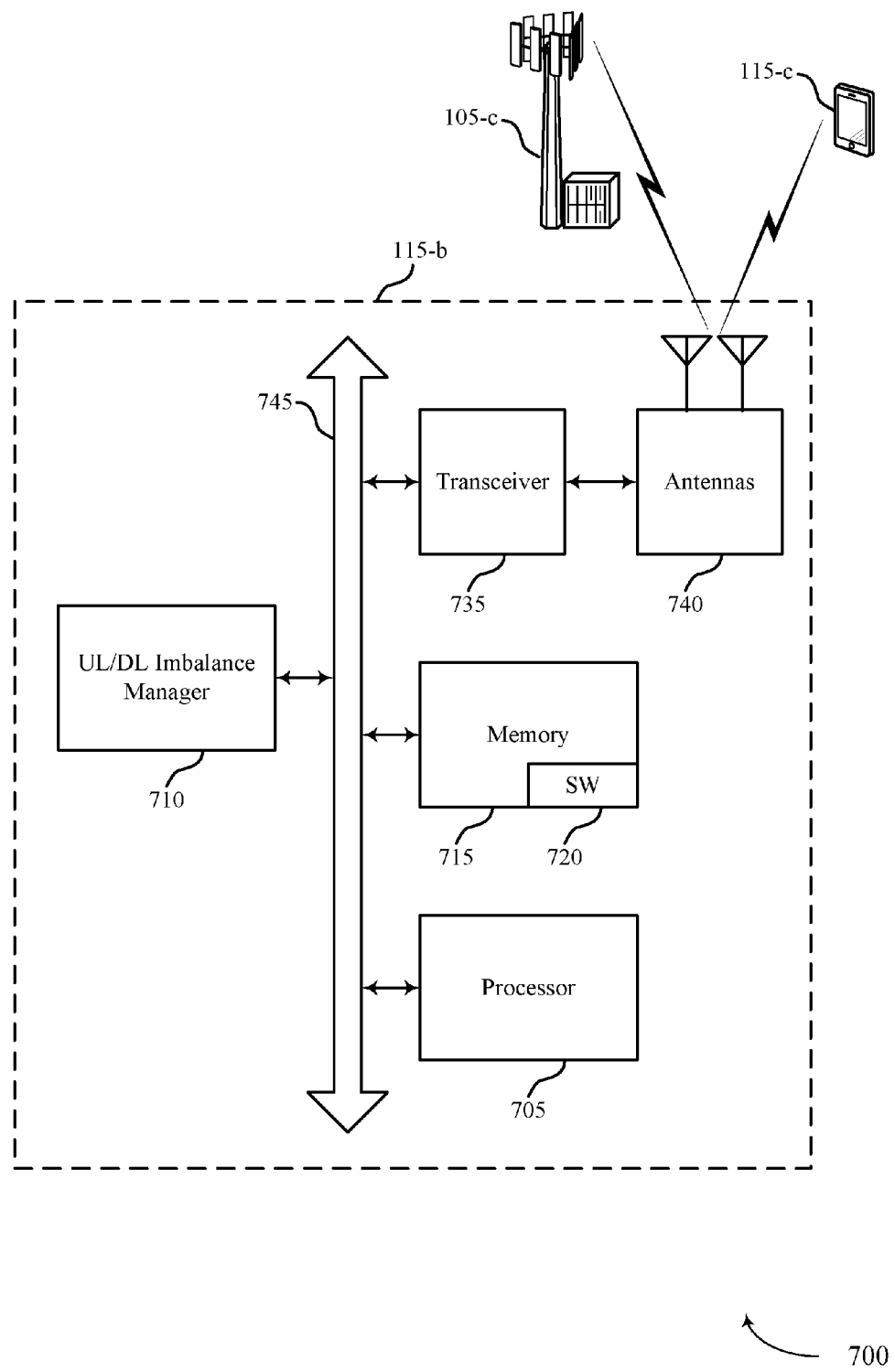
FIG. 7 shows a diagram of a system including a UE configured for addressing connection performance issues in UL/DL imbalance scenarios in accordance with various aspects of the present disclosure.

FIG. 7 shows a diagram of a system 700 including a UE 115-b configured to address connection performance issues in UL/DL imbalance scenarios in accordance with various aspects of the present disclosure. System 700 may include UE 115-b, which may be an example of a multi-antenna device 200 or a UE 115 described with reference to FIGS. 1, 2, and 4. UE 115-b may include a UL/DL imbalance manager 710, which may be an example of UL/DL imbalance managers 230 described with reference to FIG. 2 or 6. UE 115-b may also include components for bi-directional voice and data communications including components for transmitting communications and components for receiving communications. For example, UE 115-b may communicate bi-directionally with UE 115-c or base station 105-c.

UE 115-b may also include a processor 705, and memory 715 (including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or another UE 115. The transceiver 735 may include a modem to modulate the packets and provide the modulated packets to the antenna(s) 740 for transmission, and to demodulate packets received from the antenna(s) 740. While UE 115-b may include a single antenna 740, UE 115-b may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., a method to address connection performance issues in UL/DL imbalance scenarios, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

The components of multi-antenna device 200, and UL/DL imbalance managers 230, 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 400 of FIGS. 1 and 4—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment, comprising:
   receiving, while in a connected mode with a serving cell of a base station, a signal via a first antenna and a second antenna of the user equipment, wherein the first antenna is associated with a transmit chain of the user equipment;
   identifying an imbalance between a first signal measurement of the signal received via the first antenna and a second signal measurement of the signal received via the second antenna;
   comparing the identified imbalance with an imbalance threshold; and
   selecting the first signal measurement or the second signal measurement for mobility event reporting based at least in part on a result of the comparison.

2. The method of claim 1, further comprising:
   determining that the first signal measurement is less than the second signal measurement by an amount greater than or equal to the imbalance threshold; and
   wherein the first signal measurement is selected for the mobility event reporting.

3. The method of claim 2, further comprising:
   triggering reporting of a mobility event based at least in part on a result of a comparison of the first signal measurement to one or more mobility reporting thresholds.

4. The method of claim 2, further comprising:
   selecting, based on the determining, a third signal measurement of a second signal from a non-serving cell received via the first antenna for utilization in the mobility event reporting.

5. The method of claim 2, further comprising:
   comparing the first signal measurement to a signal measurement threshold,
   wherein the selecting the first signal measurement is further based on identifying that the first signal measurement is below the signal measurement threshold.

6. The method of claim 1, further comprising:
   identifying a second imbalance between a third signal measurement of a second signal from a non-serving cell received via the first antenna and a fourth signal measurement of the second signal received via the second antenna; and
   selecting the third signal measurement or the fourth signal measurement for the mobility event reporting based on a result of a comparison of the second imbalance to a second imbalance threshold.

7. The method of claim 6, further comprising:
   determining that the third signal measurement is less than the fourth signal measurement by an amount greater than or equal to the second imbalance threshold; and
   wherein the third signal measurement is selected for the mobility event reporting.

8. The method of claim 1, wherein the selecting the first signal measurement or the second signal measurement for the mobility event reporting comprises determining that the first signal measurement is less than the second signal measurement by an amount greater than or equal to the imbalance threshold for a predetermined number of measurements.

9. The method of claim 1, wherein the imbalance threshold is dynamically adjusted based at least in part on one or more of the first signal measurement, the second signal measurement, a mobility reporting threshold, or a mobility reporting hysteresis.

10. An apparatus for wireless communication at a user equipment, comprising:
    means for receiving, while in a connected mode with a serving cell of a base station, a signal via a first antenna and a second antenna of the user equipment, wherein the first antenna is associated with a transmit chain of the user equipment;
    means for identifying an imbalance between a first signal measurement of the signal received via the first antenna and a second signal measurement of the signal received via the second antenna;
    means for comparing the identified imbalance with an imbalance threshold; and
    means for selecting the first signal measurement or the second signal measurement for mobility event reporting based at least in part on a result of the comparison.

11. The apparatus of claim 10, further comprising:
    means for determining that the first signal measurement is less than the second signal measurement by an amount greater than or equal to the imbalance threshold; and
    wherein the first signal measurement is selected for the mobility event reporting.

12. The apparatus of claim 11, further comprising:
    means for triggering reporting of a mobility event based at least in part on a result of a comparison of the first signal measurement to one or more mobility reporting thresholds.

13. The apparatus of claim 11, further comprising:
    means for selecting, based on the determining, a third signal measurement of a second signal from a non-serving cell received via the first antenna for comparison to the first signal measurement for triggering reporting of a mobility event.

14. The apparatus of claim 11, further comprising:
    means for comparing the first signal measurement to a signal measurement threshold,
    wherein the selecting the first signal measurement is further based on identifying that the first signal measurement is below the signal measurement threshold.

15. The apparatus of claim 10, wherein the means for selecting the first signal measurement or the second signal measurement for the mobility event reporting selects the first signal measurement based on determining that the first signal measurement is less than the second signal measurement by an amount greater than or equal to the imbalance threshold for a predetermined number of measurements.

16. The apparatus of claim 10, wherein the imbalance threshold is dynamically adjusted based at least in part on one or more of the first signal measurement, the second signal measurement, a mobility reporting threshold, or a mobility reporting hysteresis.

17. An apparatus for wireless communication at a user equipment, comprising:
    a processor;
    memory in electronic communication with the processor; and
    instructions stored in the memory and operable, when executed by the processor, to cause the apparatus to:
        receive, while in a connected mode with a serving cell of a base station, a signal via a first antenna and a second antenna of the user equipment, wherein the first antenna is associated with a transmit chain of the user equipment;
        identify an imbalance between a first signal measurement of the signal received via the first antenna and a second signal measurement of the signal received via the second antenna;
        compare the identified imbalance with an imbalance threshold; and
        select the first signal measurement or the second signal measurement for mobility event reporting based at least in part on a result of the comparison.

18. The apparatus of claim 17, wherein the instructions are operable to cause the processor to:
    determine that the first signal measurement is less than the second signal measurement by an amount greater than or equal to the imbalance threshold; and
    wherein the first signal measurement is selected for the mobility event reporting.

19. The apparatus of claim 18, wherein the instructions are operable to cause the processor to:
    trigger reporting of a mobility event based at least in part on a result of a comparison of the first signal measurement to one or more mobility reporting thresholds.

20. The apparatus of claim 18, wherein the instructions are operable to cause the processor to:
    select, based on the determining, a third signal measurement of a second signal from a non-serving cell received via the first antenna for utilization in the mobility event reporting.

21. The apparatus of claim 18, wherein the instructions are operable to cause the processor to:
    compare the first signal measurement to a signal measurement threshold,
    wherein the selecting the first signal measurement is further based on identifying that the first signal measurement is below the signal measurement threshold.

22. The apparatus of claim 17, wherein the instructions are operable to cause the processor to:
    select the first signal measurement for the mobility event reporting based on determining that the first signal measurement is less than the second signal measurement by an amount greater than or equal to the imbalance threshold for a predetermined number of measurements.

23. The apparatus of claim 17, wherein the imbalance threshold is dynamically adjusted based at least in part on one or more of the first signal measurement, the second signal measurement, a mobility reporting threshold, or a mobility reporting hysteresis.

24. A non-transitory computer-readable medium storing code for wireless communication at a user equipment, the code comprising instructions executable to:
    receive, while in a connected mode with a serving cell of a base station, a signal via a first antenna and a second antenna of the user equipment, wherein the first antenna is associated with a transmit chain of the user equipment;
    identify an imbalance between a first signal measurement of the signal received via the first antenna and a second signal measurement of the signal received via the second antenna;
    compare the identified imbalance with an imbalance threshold; and select the first signal measurement or the second signal measurement for mobility event reporting based at least in part on a result of the comparison.

25. The non-transitory computer-readable medium of claim 24, wherein the instructions are executable to:
determine that the first signal measurement is less than the second signal measurement by an amount greater than or equal to the imbalance threshold; and
wherein the first signal measurement is selected for the mobility event reporting.

26. The non-transitory computer-readable medium of claim 25, wherein the instructions are executable to:
trigger reporting of a mobility event based at least in part on a result of a comparison of the first signal measurement to one or more mobility reporting thresholds.

27. The non-transitory computer-readable medium of claim 25, wherein the instructions are executable to:
select, based on the determining, a third signal measurement of a second signal from a non-serving cell received via the first antenna for utilization in the mobility event reporting.

28. The non-transitory computer-readable medium of claim 25, wherein the instructions are executable to:
compare the first signal measurement to a signal measurement threshold,
wherein the selecting the first signal measurement is further based on identifying that the first signal measurement is below the signal measurement threshold.

29. The non-transitory computer-readable medium of claim 24, wherein the instructions are executable to:
select the first signal measurement for the mobility event reporting based on determining that the first signal measurement is less than the second signal measurement by an amount greater than or equal to the imbalance threshold for a predetermined number of measurements.

30. The non-transitory computer-readable medium of claim 24, wherein the imbalance threshold is dynamically adjusted based at least in part on one or more of the first signal measurement, the second signal measurement, a mobility reporting threshold, or a mobility reporting hysteresis.

* * * * *